United States Patent [19]

Feldstein

[11] Patent Number: 5,411,821
[45] Date of Patent: May 2, 1995

[54] INTEGRAL BATTERY ELECTRODE STRUCTURE FOR LEAD/ACID BATTERIES

[75] Inventor: Robert S. Feldstein, Pelham, N.Y.

[73] Assignee: Derafe, Ltd., Buffalo, N.Y.

[21] Appl. No.: 74,361

[22] Filed: Jun. 10, 1993

[51] Int. Cl.$^6$ ............................................. H01M 4/36
[52] U.S. Cl. ................................... 429/226; 429/225; 429/228; 429/245
[58] Field of Search ............... 429/245, 226, 228, 225; 252/182.1; 141/32, 33, 1.1

[56] References Cited

U.S. PATENT DOCUMENTS

| | | | |
|---|---|---|---|
| 2,317,759 | 4/1943 | Haebler | 429/245 X |
| 3,309,228 | 3/1967 | Dodson et al. | 429/228 X |
| 3,486,940 | 12/1969 | Ruben | 429/245 X |
| 4,038,170 | 7/1977 | Rhees et al. | 429/228 X |
| 4,107,407 | 8/1978 | Koch | 429/245 X |
| 4,166,155 | 8/1979 | Mao et al. | 429/245 X |
| 5,017,446 | 5/1991 | Reichman et al. | 252/182.1 X |
| 5,045,170 | 9/1991 | Bullock et al. | 429/228 X |
| 5,250,374 | 10/1993 | Zhang | 429/225 X |

OTHER PUBLICATIONS

XA-200: Proposed Hybrid Electric Vehicle . . . Lead Acid Battery (no month), (1991), Eskra et al.; Johnson Controls Inc., *ISATA Conference Paper*, pp. 305–311.

*Design News*, Oct. 21, 1991; Electric Vehicle Race Gathers Momentum; Iverson.

Publisher Unknown, date unknown; Fischetti; Here Comes the Electric Car . . . ; pp. 34–43.

*Popular Mechanics*, Sep. 1991; New Age Ev.; Shuldiner; pp. 27–29 & 102.

*Popular Mechanics*, Sep. 1991; Battery Chargers; Allen, pp. 30, 31.

*Toronto Star*, Aug. 15, 1993; Batteries at GM . . . Run Down Fast, Oscar Suris (Dow Jones).

Primary Examiner—John S. Maples
Attorney, Agent, or Firm—Beveridge, DeGrandi, Weilacher & Young

[57] ABSTRACT

An integral battery electrode structure for lead/acid battery plates is provided. The principle structure material is elemental lead or lead alloyed with antimony or calcium. At least the surface of the lead or alloy has an ion implanted or atomic embedded graded junction of at least one other atomic species, such as titanium, cadmium, or bismuth. Additionally, highly oxidative atomic species such as fluorine, chlorine, or metallic components such as titanium, tin, vanadium, chromium, or rhodium may be added at the surface of the lead or lead alloy. Optionally, an element such as cadmium, arsenic, uranium, barium or bismuth may be added at the surface and within several atomic layers below the surface in such a manner that the concentration may be from 0.05% to about 10.0% of the total mass in that region but that the total concentration in the electrode structure is from about 50 to about 350 parts per billion. The addition of the further atomic species at and just below the surface of the lead or lead alloy will assure better operating characteristics of the battery plate due to the additional species without any significant loss of other characteristics or ecological acceptability due to the presence of the other atomic species. A specific embodiment contemplates conventional lead or lead alloy grids having titanium and optionally also fluorine embedded at the surface of the grid structure.

11 Claims, No Drawings

INTEGRAL BATTERY ELECTRODE STRUCTURE FOR LEAD/ACID BATTERIES

FIELD OF THE INVENTION

This invention relates to battery electrode structures for lead/acid battery plates. In particular, this invention relates to lead/acid battery plates that may otherwise have a conventional configuration by way of a cast or molded grid, for example, but having improved operating and physical characteristics because of the addition of at least one other atomic species at and just below the surface of the grid structure.

BACKGROUND OF THE INVENTION

This application is one of a series of applications relating to improved methods and structures for electrodes. Such electrodes will most often find their utility as plates for lead/acid batteries, but may also find utility in fuel cells, and as electrolysis electrodes.

However, the present invention is more particularly directed to conventional battery plates structures as they are found in ordinary lead/acid batteries in the market at the time that this application is filed. Conventional lead/acid battery plates generally comprise a molded or cast grid into which paste of active materials is placed. A negative lead/acid battery plate is essentially elemental lead, and a positive lead/acid battery plate is essentially lead oxide. However, conventional lead/acid battery plates have a number of shortcomings: First, they are heavy and inefficient as to the use of lead because the material of the grid may only partially enter into the electrochemical energy conversion process, since the grid is essentially a structural support element. Also, there is a great likelihood of plate failure due to the development of cracks in the lead, and because of the tendency of sulphation of lead oxide to become lead sulphate—resulting in a loss of active material. Conventional lead/acid battery plates are not capable of withstanding prolonged or excessive vibration, which may again lead to structural failure or the loss of active material falling out or away from the grids.

There are several co-pending applications some of which have matured into patents, filed of even date herewith, all of which are related in one way or another to different aspects of plate technologies. All patents applications are in the name of the inventor Feldstein, herein, and all are commonly assigned unto Derafe, Ltd.

The first of those is application Ser. No. 08/074,363 entitled METHODS FOR FABRICATING BATTERY PLATES FOR LEAD/ACID BATTERIES, now U.S. Pat. No. 5,379,502 and is particularly directed to methods by which thin layers of lead may be produced, formed, and surface treated so as to provide a battery plate having an exposed active surface area of the discrete plate unit which is at least 150% of its projected area. The application also provides methods for oxidizing lead surfaces in situ, whereby a pre-formed positive plate is provided without the necessity for post-forming the battery after it has been assembled.

A second application is entitled CORED BATTERY PLATES FOR LEAD/ACID BATTERIES, (U.S. Pat. No. 5,339,873) and it is directed to cored plates in general surfaces or other materials such as lead or lead oxide may be adhered to a metallic core without fear of delamination during active use. When each side of the plate is different than the other, then they may be used in bipolar batteries as described in a third application Ser. No. 08/074,747 entitled BIPOLAR LEAD/ACID BATTERIES, application U.S. Ser. No. 08/074,360.

One further application is entitled INTEGRAL ELECTRODE STRUCTURES HAVING FILLER ADDITIVES, now allowed application U.S. Ser. No. 08/074,747 and it is directed to battery electrode or other electrode structures such as for fuel cells or electrolysis electrodes where a filler additive material is included in the metal electrode structure so as to provide added strength to the structure.

The present application relates to improved battery electrode structures which are otherwise as generally found in the market at the time that this application is filed. The present invention requires the use of ion implantation or atomic embedding techniques which are also as described in the application relating to cored battery plates for lead/acid batteries.

Essentially, the present invention is directed to the addition of one or more further atomic species at or near the surface of the lead or lead alloy to alter or adjust the physical and/or electrochemical properties of the surface, and by so doing to adjust the apparent physical and/or electrochemical properties of the grid or electrode structure per se. Essentially, therefore, the one or further additional atomic species that is added to the structure of the lead or lead alloy can be considered in some respects to function in the same manner as a "dopant".

With respect to lead or lead alloy grids of battery plates, a particularly suitable combination of additional atomic species is the use of titanium and fluorine, where a graded junction of titanium in the lead is first established, and then fluorine is added to the crystalline structure at the surface. The utility of such structures becomes evident when it is considered that the use of titanium per se as an additive by way of a graded junction—titanium and lead will not significantly alloy—is one which is desirable because of the high hydrogen threshold of titanium. However, titanium is also subject to passivation. On the other hand, titanium fluorine ceramics show remarkable corrosion resistance, but they are far too brittle to be employed in lead/acid batteries which are subject not only to relatively rough handling during the manufacturing of the battery, but also to vibration and shock during their active life. If fluorine atoms are introduced into a graded junction of titanium with lead, then a barrier against the possibility of $PbO_2/PbO_4$ development is created because local lattice abnormalities of the lead or lead alloy structure are then developed. However, the fluorine would be extremely difficult to displace electrochemically with oxygen, and therefore provides no meaningful function in a battery.

As will be described hereafter, ion implantation or neutral atom embedment techniques can be employed to prepare a graded junction. All of the conventional techniques known to a person skilled in the art are applicable to this system. For example, the addition of a substantial tin component, perhaps up to 1%, as a corrosion retardant would be an appropriate modification. Further, a fairly thick surface layer or layers that may be several thousands of an inch in depth, and which may further consist of lead plus immiscible additives such as rhodium, cobalt, or silicon, could be deposited such as by flame or plasma spraying prior to the embedment process. Thus, lead or lead alloy can be bombarded with titanium, and either intermittently or afterwards it may optionally also be bombarded by fluorine. Other atomic species are discussed below. By such bombardment of lead or lead alloy grid structures for conventional lead-/acid battery plates, prior to the grid being pasted, an improved battery plate will be manufactured. By these steps, the possibility of plate corrosion is significantly reduced. Moreover, by following the procedures of the present invention, no significant modification to existing battery plate manufacturing facilities would be required.

Particularly if a titanium bombarded lead structure has been manufactured, that structure may tend to be somewhat brittle at its surface. However, because the structure is still essentially lead, it may be annealed after the titanium ion or titanium atom implantation procedure has taken plate, so as to re-establish ductility of the lead structure. Of course, care would have to be taken during the annealing process that there is not unwanted diffusion of the embedded titanium further into the lead.

By controlling or adjusting the accelerator voltage at which ion bombardment procedures might take plate, an initial implantation depth of several hundred atomic layers may be achieved. A heavy ion, such as titanium, having high kinetic energy imparted to it at high accelerator voltages in the range of 250 kilo electron volts (K.E.V.) will penetrate deeply even into a dense and strongly bound crystal matrix such as lead or lead alloy. The acceleration voltage may be progressively reduced, perhaps coupled with longer exposure times, so as to increase the relative implant population of bombarded ions into the surface of the receptor structure as the depth of ion penetration decreases. By the time that the implanted population reaches just below the surface, there may be accumulative implant population in the range of $10^{16}$ to $10^{17}$ or more atoms per square centimeter for typical applications. Then, if the accelerator voltage is further reduced, there will be surface deposition at 30 K.E.V. or below, which in essence amounts to plasma spraying.

Thus, a controlled and graded distribution can be produced. This has further advantages when it is considered that, in keeping with the teachings of the copending application relating to methods for fabricating battery plates for lead/acid batteries, oxygen ions may be implanted into the surface of the lead so as to convert the surface to lead oxide. It follows that if the oxygen ion implantation depth is somewhat greater than the general conversion depth at which the lead may be converted to lead oxide, then there will be a much greater resistance to ongoing conversion over the life of the battery plate, and therefore the cycle or float life of the battery plate will be enhanced.

As contemplated above, further additional "dopant" atomic species may be embedded; the principle example being the addition of fluorine in concentrations of about $10^{12}$ atoms per square centimeter. Fluorine atoms would be embedded using an accelerator voltage profile to decrease the depth of fluorine atom embedment over time of from 100 K.E.V. to 30 K.E.V., for example.

In summary, ion implantation techniques or neutral atom embedment techniques of one or more atomic species into the surface of a substrate metal may be controlled by controlling the accelerator voltage. The impact of the cladding species on the substrate metal is important, and is a function of the initial kinetic energy. Thus, the ion bombardment or neutral atom embedment characteristics, as a function of initial kinetic energy, may be controlled by controlling the acceleration voltage between the source and the target. As noted above, with an initial high acceleration voltage, the ions of the cladding material, or the neutral atom embedment, will initially impact the substrate material and be deeply embedded thereinto. Then, the acceleration voltage may be gradually reduced so that there will be less impact and therefore a layer of implanted metal will be developed. Thereafter, there may be a plasma spray of the cladding material, or even flame spraying or charged atom deposition of the cladding material. Ion implantation itself is generally monatomic at any instant in time, for any one gun being used. However, the use of multiple ion sources which can be switched sequentially will permit effective complex chemistry, as discussed in greater detail hereafter.

It must be understood that when such as a titanium to lead graded junction has been established, that junction must not be permitted to be alloyed or otherwise disturbed. Thus, a usual procedure would be for about 200 atoms thick of titanium ion implantation to first be placed into the lead surface. Then, it is possible to anneal the lead surface; for example, such as by photon absorption from infrared sources.

Standards for the lead/acid industry at this time are generally such that plate thicknesses of 2.0 mm are considered to be thin, whereas plate thicknesses of 5.0 mm to 7.0 mm are considered to be thick. Indeed, under current industry standards, plates of 7.0 mm up to or exceeding 10.0 mm for standby batteries are to be found in the field. Batteries having plates according to the present invention may be thinner because less corrosion reserve will be required if "reserve lead" is replaced with "chemically less accessible lead". By reducing the volume of the grid lead which is converted to active material over the life of the cell, the evolutionary changes in the chemistry of the cell—that is, the changes of the chemistry of the cell that will occur over the life of the cell—will also be reduced. There may also be further atomic species embedded in their plate surfaces, where the atomic species is not generally one which is ecologically acceptable, as discussed hereafter.

Further discussion now follows as to control of the profile of a graded junction between the cladding material and the core. As well, some discussion follows as to the use of additional "dopant" materials whereby phenomena such as delamination or corrosion, which may occur in the future while the battery plate or other cored structure according to the present invention is being used, may be effectively and substantially precluded.

The above discussion has included reference to the preparation of a graded junction by selectively altering the voltage being used during ion implantations procedures, over time. Ion implantation—or for that matter, plasma spraying—may be controlled as to the impact and depth of penetration of the cladding metal or atomic species by control at any instant in time of the accelerator voltage being used. Therefore, the profile of the junction between the cladding material and the core material may be controlled and altered.

Generally, in ion beam implantation or conventional plasma operations, the procedure is started with the highest voltage so as to provide the deepest implant of the cladding material into the core material. Such implantation will generally result in a low population density of the cladding ions. By reducing the accelerator voltage, later ion implantation is not subject to local capture re-heating. Thus, subsequent implants are essentially undisturbed so that the concentration gradient of the implanted ions should not be affected by localized or spot heating due to the impact of later implanted ions. Accordingly, carrying out such procedures by controlling the accelerator voltage from high to low will result in a profile which may be predetermined and reproducible. As the kinetic energy per ion or per atom is reduced, the resultant heating is also reduced. Therefore, the current density may be raised without exceeding the target temperature at which the previously implanted "dopant" atoms become mobile.

An example of a bi-component structure which may be produced in keeping with the discussions above but which is not itself a battery plate, may be a vanadium steel part onto which titanium is surface cladded. In the preparation of such a structure, the initial accelerator voltage may be in the range of 250 K.E.V. (Kilo Electron Volts), whereby initial ion implantation of several hundred atomic layers may be achieved. Heavy ions, such as titanium, having kinetic energy in this range will penetrate deeply, even into a dense and strongly bound core matrix. Then, progressively reducing the accelerator voltage while, at the same time, providing for longer exposure times, will result in an increase in the relative implant population as the depth of that ion implantation is decreased. By the time 50 K.E.V. accelerator voltage is reached, the implanted ion population should be just below the surface, and the cumulative implant population may be in the range of $10^{16}$ to $10^{17}$ or more atoms per square centimeter for typical applications. If the accelerator voltage is reduced to, say, 30 K.E.V., the procedure will result in surface deposition, and if the accelerator voltage is reduced somewhat below 30 K.E.V. there will be heavy surface deposition which is substantially equivalent to plasma spraying.

Clearly, however, in the event that there may be any damaged surface layers which might be spalled or dislocated due to initial high accelerator voltage ion bombardment, it may be necessary to repair such damage such as by annealing. By adopting annealing procedures early in the implant cycle, a resultant profile may be achieved which is an arbitrary superposition of the profiles of all of the accelerator voltages that have been employed, ranging from the maximum to the minimum accelerator voltages, where the resultant profile is also a function of or is "weighted" by the inverse rate of accelerator voltage change as a time function.

By the same principals, and in keeping with the present invention, a controlled graded distribution of cladding material into and at the surface of the substrate or battery grid material may be produced. This is distinct from the kind of relatively uncontrolled profile that may result from the use of a fixed accelerator voltage.

The graded junction may be even further controlled by employing addition atomic species during ion bombardment procedures. For example, fluorine might be added at appropriate times during the ion bombardment procedures so that fluorine ions will be implanted in the titanium/lead graded junction. As noted above, titanium has a high hydrogen threshold, but titanium may also be subject to passivation effects. It is also known that titanium fluoride ceramics are highly corrosion resistant, but they are too brittle to be used in most practical applications.

However, by introducing fluorine atoms at low concentrations—in the range of 200 p.p.m.—into a lead/titanium graded junction, a propagation stop or barrier may be produced which may effectively preclude progressive development of lead sulphate in a lead oxide active surface. That propagation stop or barrier is produced by the generation of lead/fluorine bonds and the occasional titanium/fluorine bond. Thus, local lattice abnormalities in the grid structure will develop. However, since fluorine has a higher chemical activity than oxygen, displacement will be an unfavourable reaction, and grid corrosion will be significantly retarded.

Fluorine may be added to the graded junction between lead and titanium, for example, in somewhat lower concentrations of, say, $10^{12}$ atoms per square centimeter. This is accomplished by providing a depth profile for the fluorine which is graded from 100 K.E.V. to 30 K.E.V. Thus, graded junctions may be provided where a further atomic species is used as a dopant.

Catalytic surfaces may likewise be prepared, and cladded sub-surfaces that may later have a further material deposited on them or be chemically converted—such as lead to lead oxide—are clearly applicable to the present invention.

Accordingly, in keeping with other features of the present invention, it may be desirable to incorporate at least one other atomic species which has a high gas overvoltage threshold with respect to lead for implantation in the lead or lead alloy grid. Such other atomic species may, for example, by cadmium or bismuth rather than titanium. An example of a further dopant material that might be used is a highly oxidative atomic species including fluorine as discussed above or also chlorine, but also including such metallic elements as vanadium, chromium, cobalt, rhodium, titanium or tin.

The use of cadmium is not favourable at the present time because it is in disfavour ecologically. Cadmium, and a number of other elements discussed below, are considered to be environmental toxics. However, if in keeping with the present invention the implanted species is not required to be present in volume but may be present only in sufficient quantities as to modify local conditions such as surface barrier height, then in keeping with the present invention it is possible to embed further atomic species having high surface concentrations but only very small or microscopic bulk content when the entire battery electrode structure is considered.

A specific example would be if, for example, $10^{16}$ cadmium atoms per square centimeter are implanted into the surface of a lead plate which is 3 millimeters thick, using a relatively low accelerator voltage of, say, 30 to 50 K.E.V. to impart relatively low embedment kinetic energy. Then, the surface concentration of the cadmium in the lead would be substantial, ranging perhaps from 0.05% up to even about 10.0% of the total mass in the region of the surface, while the total content of the cadmium with respect to the total battery electrode structure might only be in the range of from about 50 to about 350 parts per billion.

Accordingly, the principals of the present invention will permit virtually unlimited surface modification so as to obtain specific highly desirable chemical or electrochemical effects but using highly toxic materials such as cadmium, arsenic, uranium, barium, or bismuth. Because the bulk concentration may be in the range of only from about 50 to about 350 parts per billion, the toxicity of the use of such additional atomic species may not exceed the presence of those atomic species naturally occurring in sites such as landfill sites and the like, and therefore are no less ecologically preferable than the already stringent landfill and waste disposal standards being established. When lead or lead alloy grids for lead/acid batteries are manufactured in keeping with the present invention, and the manufactured plate is intended for use as a positive plate, it may then have a conventional lead oxide electrode paste added to it in keeping with manufacturing processes as they are carried out at the time that this application is filed.

Accordingly, the present invention provides a method of fabricating an integral battery electrode structure for lead/acid battery plates, in which the principal structural material is lead or lead alloy, where the method comprises the steps of:

(a) forming a lead/acid battery plate of lead or lead alloy by casting, extruding, molding, or forming sheet material for subsequent perforating or expanding;

(b) deflashing and polishing the surface of the formed lead/acid battery plate;

(c) placing at least one surface coat intermediate layer of lead by plasma or flame spraying, electrostatically coating, or vapour coating;

(d) ion or atom bombarding the surface of the formed plate with ions of at least one other atomic species using ion implantation or atomic embedment techniques having high accelerator voltages; and (e) varying the accelerator voltage from a high voltage to a lower voltage, over time.

By carrying out the above steps, an ion implantation or atomic embedded graded junction of the at least one other atomic species at the surface of the formed plate is thereby effected.

Thus, the present invention may be applicable not only to cast or molded battery plates, but also those which are extruded or even where a sheet material has been formed which may later be perforated or expanded in keeping with standard perforation or expanded metal techniques to form the battery plate.

Still further, as noted above, the method of the present invention may comprise the further step of:

(f) from time to time during the procedure of step (d), above, ceasing the ion bombardment or atomic embedment of the at least one other atomic species and alternately bombarding or embedding yet a further atomic species onto the formed battery plate.

As noted, in general the at least one other atomic species which is embedded or implanted into the formed plate has a high gas overvoltage threshold with respect to lead, and may be chosen from the group consisting of titanium, cadmium, and bismuth. The further additional atomic species which may alternately be embedded or bombarded in keeping with step (e) above, is generally one which is a highly oxidative atomic species chosen from the group consisting of fluorine, chlorine, vanadium, chromium, and barium.

Still further, as noted above, other toxic elements may be chosen as the further atomic species, including such elements as cadmium, arsenic, uranium, barium, and bismuth. Where such other toxic elements are employed, in general the concentration of that atomic species in the region of the surface and within several atomic layers below the surface of the electrode structure is in the range of from about 0.05% up to about 10.0% of the total mass in that region. However, the total concentration of the at least one other toxic atomic species within the entire structure of the battery electrode or plate will be restricted to the range of from about 50 to about 350 parts per billion.

The scope of the present invention is defined by the appended claims.

What is claimed is:

1. An integral battery electrode structure for lead/acid battery plates, wherein a principal structural material of said integral battery electrode structure is elemental lead or a lead alloy, and wherein at least the surface of said lead or lead alloy has an ion implantation or atomic embedded graded junction of at least one other atomic species.

2. The battery electrode structure of claim 1, wherein an additional atomic species is also present in said ion implantation or atomic embedded graded junction.

3. The battery electrode structure of claim 1, wherein said at least one other atomic species is one which has a high gas overvoltage threshold with respect to lead.

4. The battery electrode structure of claim 3, wherein said at least one other atomic species having a high gas overvoltage threshold with respect to lead is chosen from the group consisting of titanium, cadmium, and bismuth.

5. The battery electrode structure of claim 3, wherein said at least one other atomic species having a high gas overvoltage threshold with respect to lead is chosen from the group consisting of titanium, cadmium, and bismuth; and further comprises an additional atomic species chosen from the group consisting of fluorine, chlorine, vanadium, chromium, rhodium, cobalt, titanium, and tin.

6. The battery electrode structure of claim 5, wherein said at least one other atomic species is titanium; and wherein said additional atomic species is fluorine.

7. The battery electrode structure of claim 3, wherein said electrode structure is a lead grid having a graded junction of an ion implanted or atomic embedded species chosen from the group consisting of titanium, cadmium, and bismuth; and said electrode structure further comprises lead oxide electrode paste.

8. The battery electrode structure of claim 6, wherein said electrode structure is a lead grid, and further comprises lead oxide electrode paste.

9. The battery electrode structure of claim 1, wherein said at least one other atomic species is chosen from the group consisting of cadmium, arsenic, uranium, barium, and bismuth.

10. The battery electrode structure of claim 9, wherein said at least one other atomic species has a concentration in a region of the surface and within several atomic layers below the surface of said electrode structure in the range of from about 0.05% to about 10.0% of the total mass in that region, and wherein the total concentration of said at least one other atomic species within the entire battery electrode structure is restricted to the range of from about 50 to about 350 parts per billion.

11. The battery electrode structure of claim 1, wherein said lead alloy is an alloy of lead with from about 0% to about 4.0% of antimony or from about 0% to about 2.0% of calcium.

* * * * *